US011884864B2

(12) United States Patent
Imai et al.

(10) Patent No.: US 11,884,864 B2
(45) Date of Patent: Jan. 30, 2024

(54) METHOD FOR PRODUCING LIQUID-CRYSTAL POLYESTER PROCESSED PRODUCT

(71) Applicant: HONSHU CHEMICAL INDUSTRY CO., LTD., Tokyo (JP)

(72) Inventors: Ryota Imai, Wakayama (JP); Katsuhiko Kaneshige, Wakayama (JP)

(73) Assignee: HONSHU CHEMICAL INDUSTRY CO., LTD., Tokyo (JP)

( * ) Notice: Subject to any disclaimer, the term of this patent is extended or adjusted under 35 U.S.C. 154(b) by 175 days.

(21) Appl. No.: 17/432,885

(22) PCT Filed: Mar. 3, 2020

(86) PCT No.: PCT/JP2020/008833
§ 371 (c)(1),
(2) Date: Aug. 20, 2021

(87) PCT Pub. No.: WO2020/179767
PCT Pub. Date: Sep. 10, 2020

(65) Prior Publication Data
US 2022/0204853 A1  Jun. 30, 2022

(30) Foreign Application Priority Data
Mar. 6, 2019 (JP) .................................. 2019-040439

(51) Int. Cl.
| | | |
|---|---|---|
| *G02F 1/1333* | (2006.01) | |
| *C09K 19/38* | (2006.01) | |
| *C08G 63/06* | (2006.01) | |
| *C08J 7/12* | (2006.01) | |
| *D01D 5/42* | (2006.01) | |
| *D06M 10/02* | (2006.01) | |
| *D06M 101/32* | (2006.01) | |

(52) U.S. Cl.
CPC ........ *C09K 19/3809* (2013.01); *C08G 63/065* (2013.01); *C08J 7/123* (2013.01); *D01D 5/426* (2013.01); *D06M 10/025* (2013.01); *D06M 2101/32* (2013.01); *D10B 2331/042* (2013.01); *D10B 2401/20* (2013.01)

(58) Field of Classification Search
CPC ................ C09K 19/38; C09K 19/3804; C09K 19/3809; C08G 63/06; C08G 63/065
See application file for complete search history.

(56) References Cited

U.S. PATENT DOCUMENTS

| | | | | |
|---|---|---|---|---|
| 6,306,501 | B1 * | 10/2001 | Furuta | ..................... B32B 27/10 428/479.3 |
| 2012/0244306 | A1 * | 9/2012 | Hosoda | ..................... G09F 3/10 528/182 |
| 2018/0347108 | A1 | 12/2018 | Suizu et al. | |
| 2022/0204853 | A1 * | 6/2022 | Imai | ......................... C08J 7/123 |

FOREIGN PATENT DOCUMENTS

| | | |
|---|---|---|
| JP | H01216824 A | 8/1989 |
| JP | H03188135 A | 8/1991 |
| JP | H06200057 A | 7/1994 |
| JP | 2007302740 A | 11/2007 |
| JP | 2011096471 A | 5/2011 |
| JP | 2011141535 A | 7/2011 |
| JP | WO2019131219 A1 | 12/2020 |
| WO | 2017090270 A1 | 6/2017 |
| WO | 2019131219 A1 | 7/2019 |

OTHER PUBLICATIONS

International Search Report (ISR) dated Jun. 2, 2020, issued for International application No. PCT/JP2020/008833. (3 pages).
Okamoto Satoshi, Adhesion Technology of Liquid-Crystalline Polymer and its Application, Journal of the Adhesion Society of Japan, 2012, pp. 290-298, vol. 48, No. 8. (9 pages).
International Preliminary Report on Patentability, dated Aug. 25, 2021, for corresponding international application PCT/JP2020/008833 (1 page).
Notification Concerning Transmittal of International Preliminary Report on Patentability, dated Sep. 16, 2021, for corresponding international application PCT/JP2020/008833 (1 page).
Notification of Transmittal of Translation of the International Preliminary Report on Patentability, dated Sep. 16, 2021, for corresponding international application PCT/JP2020/008833 (1 page).
Written Opinion of the International Searching Authority, dated Jun. 2, 2020, for corresponding international application PCT/JP2020/008833 (10 page).
A Notice of Reasons for Refusal issued by the Japanese Patent Office dated Sep. 12, 2023, for Japanese counterpart application No. 2021-504099. (5 pages).

* cited by examiner

*Primary Examiner* — Geraldina Visconti
(74) *Attorney, Agent, or Firm* — Law Office of Katsuhiro Arai

(57) ABSTRACT

An object is to provide a method for producing a liquid-crystal polyester processed product, the method improving the adhesion of a liquid-crystal polyester resin, which is a poorly adhesive resin. As a solution, a method for producing a liquid-crystal polyester processed product, including a step (I) of performing an oxidation treatment on a surface of a liquid-crystal polyester resin formed body including a repeating unit represented by general formula (1), is provided.

7 Claims, 1 Drawing Sheet

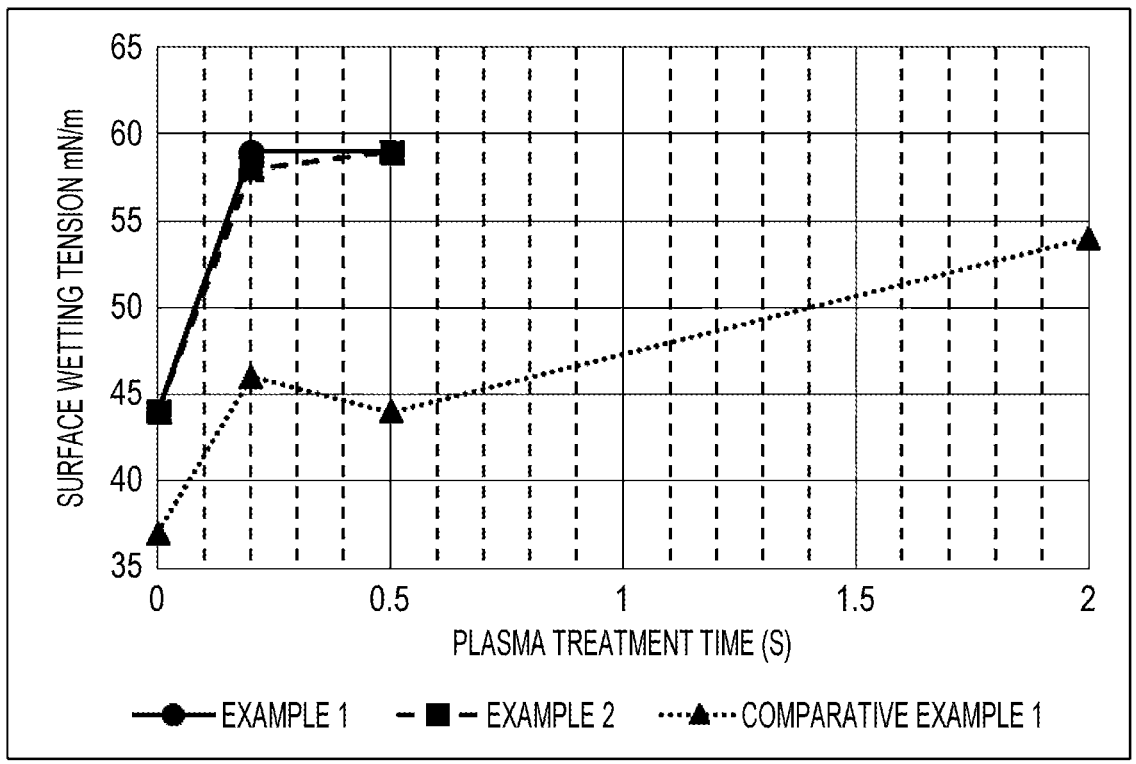

METHOD FOR PRODUCING LIQUID-CRYSTAL POLYESTER PROCESSED PRODUCT

CROSS-REFERENCE TO RELATED APPLICATIONS

This application is the U.S. National Phase under 35 U.S.C. § 371 of International Application PCT/JP2020/008833, filed Mar. 3, 2020, which claims priority to Japanese Patent Application No. JP2019-040439, filed Mar. 6, 2019. The International Application was published under PCT Article 21(2) in a language other than English.

TECHNICAL FIELD

The present invention relates to a method for producing a liquid-crystal polyester processed product, the method improving the adhesion of a liquid-crystal polyester resin, which is a poorly adhesive resin.

BACKGROUND ART

One example of a liquid-crystal polyester processed product obtained using a liquid-crystal polyester resin is a laminate such as a flexible printed circuit (FPC) including a liquid-crystal polyester formed body and metal foil bonded together. However, liquid-crystal polyester has low adhesion, and sufficient adhesive strength cannot be maintained even if an adhesive is used. Thus, the adhesive strength has been increased typically by physically or chemically roughening the surface of metal foil. However, surface roughening for improved adhesion may disadvantageously result in increased transmission loss, which is impractical in high-speed and high-capacity transmission applications. Thus, there is a need for a liquid-crystal polyester resin having high adhesion to metal foil that is less rough, preferably, smooth.

On the other hand, various techniques of performing a surface modification treatment of a liquid-crystal polyester resin to increase adhesion have also been reported. It is known that performing a corona treatment, a plasma treatment, or the like on a liquid-crystal polyester film surface improves surface wetting tension and improves adhesion to metal foil (e.g., PTL 1). NPL 1 below states that a plasma treatment causes polymer chain cleavage due to decomposition reaction and Norrish I reaction and causes Fries rearrangement, thereby introducing polar groups to improve adhesion, and that, alternatively, an ultraviolet irradiation treatment also causes molecular chain cleavage, thereby introducing polar groups to improve wettability and adhesion.

However, the introduction of a surface treatment step for increasing adhesion, if the treatment time is too long, induces polymer chain cleavage and thus may cause a reduction of film durability. Thus, there is a need for an efficient method for improving the adhesion of a laminate.

In addition, liquid-crystal polyester resins are disadvantageously difficult to dye. Coloring by mixing such a resin with a colorant such as a dye, a pigment, or carbon greatly reduces the strength of a resin formed body. Thus, there is also a strong need for a method for obtaining a colored liquid-crystal polyester processed product having high strength.

CITATION LIST

Patent Literature

PTL 1: Japanese Unexamined Patent Application Publication No. 03-188135

Non Patent Literature

NPL 1: Satoshi OKAMOTO, Journal of the Adhesion Society of Japan, 48, 290-298, (2012)

SUMMARY OF INVENTION

Technical Problem

The present invention has been made in view of the circumstances described above, and an object thereof is to provide a method for producing a liquid-crystal polyester processed product, the method improving the surface properties such as adhesion and colorability of a liquid-crystal polyester resin, which is a poorly adhesive resin and is difficult to dye.

Solution to Problem

The present inventors have intensively studied in view of the problems of the related art and found that the use of a liquid-crystal polyester resin containing a structural unit derived from an aromatic hydroxycarboxylic acid having an alkyl group on an aromatic ring such as a benzene ring allows wetting tension to be improved by a short-time surface treatment, thereby completing the present invention.

The present invention is as follows.

1. A method for producing a liquid-crystal polyester processed product, including a step (I) of performing an oxidation treatment on a surface of a liquid-crystal polyester resin formed body including a repeating unit represented by general formula (1) below.

[Chem. 1]

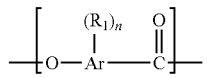

(1)

(In formula, Ar represents a phenylene group, a naphthylene group, or a biphenylene group, $R_1$ represents a linear or branched alkyl group having 1 to 6 carbon atoms or a cyclic alkyl group having 5 to 6 carbon atoms, and n represents an integer of 1 to 4.)

2. The method for producing a liquid-crystal polyester processed product according to 1, in which the oxidation treatment in the step is a plasma treatment, a corona treatment, an ultraviolet (UV) irradiation treatment, a flame treatment, an electron beam treatment, a chemical treatment with an oxidizing agent, or a heat treatment in the presence of oxygen.

3. The method for producing a liquid-crystal polyester processed product according to 1 or 2, further including a step (II) of stacking a resin layer or a metal layer on the surface on which the oxidation treatment has been performed to produce a laminate.

4. The method for producing a liquid-crystal polyester processed product according to 1 or 2, further including a step (III) of coloring the surface on which the oxidation treatment has been performed to produce colored liquid-crystal polyester fibers.

Advantageous Effects of Invention

As compared to methods known in the art, the method for producing a liquid-crystal polyester processed product according to the present invention provides a liquid-crystal polyester processed product that is less likely to undergo performance degradation and has high wetting tension, and thus is very useful.

The method can improve the adhesive performance of a liquid-crystal polyester resin, which has conventionally been a poorly adhesive resin, and thus can provide a laminate having high adhesion to smooth metal foil.

In addition, the method can increase the binding properties of a liquid-crystal polyester resin, which has conventionally been unable to be dyed, to dyestuff to thereby provide liquid-crystal polyester processed products with a variety of hues, and thus has great advantages such as being applicable to textile goods.

BRIEF DESCRIPTION OF DRAWINGS

FIG. 1 shows the results of an evaluation of the wetting tension of surface-treated resin surfaces of Examples 1 and 2 and Comparative Example 1.

DESCRIPTION OF EMBODIMENTS

Hereinafter, the present invention will be described in detail.

<Regarding Liquid-Crystal Polyester Processed Product Provided by Present Invention>

A liquid-crystal polyester processed product related to the present invention means an article that has been through a step (I) of performing an oxidation treatment on a surface of a liquid-crystal polyester formed body including a repeating unit represented by general formula (1) or a product obtained by further processing the article, specifically, for example, a laminate or colored liquid-crystal polyester fibers. One of them, the laminate will be described below.

In the laminate provided by the present invention, at least one layer includes a layer formed of a liquid-crystal polyester resin including a repeating unit represented by general formula (1) below.

[Chem. 2]

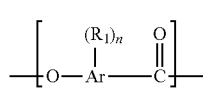

(1)

(In formula, Ar represents a phenylene group, a naphthylene group, or a biphenylene group, $R_1$ represents a linear or branched alkyl group having 1 to 6 carbon atoms or a cyclic alkyl group having 5 to 6 carbon atoms, and n represents an integer of 1 to 4.)

In addition, a resin layer or a metal layer, or a resin layer and a metal layer are included as other layers. The laminate may be composed of two layers or more than two layers.

To obtain the laminate, the layer formed of the liquid-crystal polyester resin including a repeating unit represented by general formula (1) above may be subjected to the below-mentioned step (I) of performing an oxidation treatment on only one surface of a formed plate or formed film of the resin and to a step (II) of stacking a resin layer or a metal layer on the surface on which the oxidation treatment has been performed to produce the laminate, or may be subjected to the below-mentioned step (I) of performing an oxidation treatment on both surfaces of a formed plate or formed film of the resin and to the step (II) of stacking a resin layer or a metal layer on the both surfaces on which the oxidation treatment has been performed.

Next, one of the liquid-crystal polyester processed products related to the present invention, the colored liquid-crystal polyester fibers will be described below.

To obtain the colored liquid-crystal polyester fibers provided by the present invention, the surface of a fibriform liquid-crystal polyester formed body obtained by processing the liquid-crystal polyester resin including a repeating unit represented by general formula (1) above by a method known in the art, for example, melt spinning may be colored after the below-mentioned step (I) of performing an oxidation treatment and subjected to a step (III) of producing colored liquid-crystal polyester fibers. Alternatively, the surface of a liquid-crystal polyester formed body such as a filament yarn obtained by spinning of fibers obtained by melt spinning, a fabric woven from fibers or yarns, or a nonwoven fabric obtained by deposition of fibers may be subjected to the step (III) of coloring the surface with a cationic dye or the like after the below-mentioned step (I) of performing an oxidation treatment.

To obtain fibers with higher strength and a higher modulus of elasticity, the spun fibriform formed body may be heat treated in an inert gas or in vacuum, and is preferably heat treated.

Conventionally, polyester resin fibers are colored by, for example, preparation of a masterbatch with a colorant added at a stage before a spinning process, referred to as "solution dyeing", and thus have a problem in that the colorant added reduces fiber strength. In contrast, the fibers provided by the present invention can maintain high mechanical properties (e.g., high strength and high heat resistance) intrinsic to the liquid-crystal polyester resin because the surface of fibers obtained by melt spinning or the surface of a fiber formed body obtained by, for example, spinning, spinning and weaving, or deposition of fibers obtained by melt spinning is colored or dyed, and thus is useful.

<Regarding Liquid-Crystal Polyester Resin Related to Present Invention>

The liquid-crystal polyester resin including a repeating unit represented by general formula (1) used in the present invention is obtained by polycondensation of an aromatic hydroxycarboxylic acid and/or a derivative thereof (A) represented by general formula (1') given below and another aromatic hydroxycarboxylic acid (B).

In general formula (1), Ar represents a phenylene group, a naphthylene group, or a biphenylene group. In particular, Ar is preferably a phenylene group or a naphthylene group, particularly preferably a phenylene group.

When Ar in general formula (1) is a phenylene group, the repeating unit can be represented as general formula (2) below.

[Chem. 3]

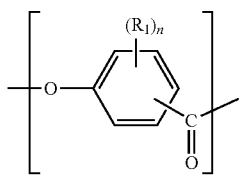
(2)

(In formula, $R_1$ and n are as defined in general formula (1).)

In particular, the structure represented by general formula (3) below is preferred.

[Chem. 4]

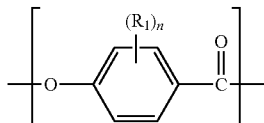
(3)

When Ar in general formula (1) is a naphthylene group, the repeating unit can be represented as general formula (4) below.

[Chem. 5]

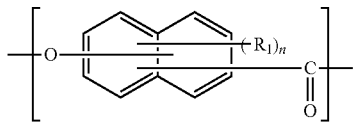
(4)

(In formula, $R_1$ and n are as defined in general formula (1).)

In particular, the structure represented by general formula (5) below is preferred.

[Chem. 6]

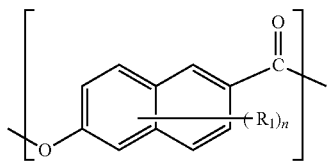
(5)

(In formula, $R_1$ and n are as defined in general formula (1).)

When Ar in general formula (1) is a biphenylene group, the repeating unit can be represented as general formula (6) below.

[Chem. 7]

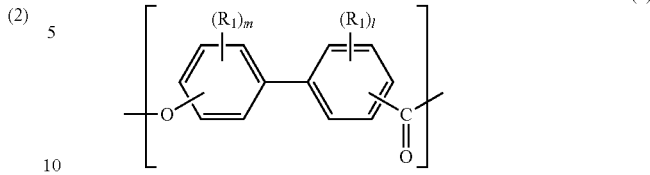
(6)

(In formula, $R_1$ is as defined in general formula (1), m and l are each an integer of 0 to 4, and m+l is an integer of 1 to 4.)

In particular, the structure represented by general formula (7) below is preferred.

[Chem. 8]

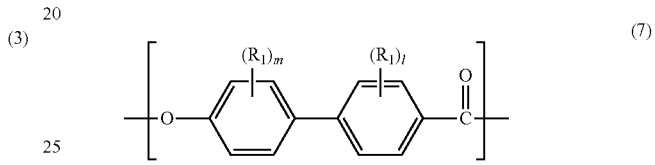
(7)

(In formula, $R_1$ is as defined in general formula (1), and m and l are as defined in general formula (6).)

$R_1$ in general formulae (1) to (7) above represents a linear or branched alkyl group having 1 to 6 carbon atoms or a cyclic alkyl group having 5 to 6 carbon atoms. When n, or m+l is 2 to 4, $R_1$ may all be the same or different from each other. In particular, $R_1$ is preferably a linear or branched alkyl group having 1 to 4 carbon atoms, more preferably an alkyl group having one carbon atom, namely, a methyl group, or a linear or branched alkyl group having four carbon atoms, particularly preferably a methyl group.

n in general formulae (1) to (5) above is an integer of 1 to 4. In particular, n is preferably 1 to 2, particularly preferably 1.

m and l in general formulae (6) and (7) above are each an integer of 0 to 4, and m+l is an integer of 1 to 4. Preferably, m and l are each an integer of 0 to 2, and m+l is 1 to 2. Particularly preferably, m and l are each an integer of 0 or 1, and m+l is 1.

<Regarding Aromatic Hydroxycarboxylic Acid and/or Derivative Thereof (A) Represented by General Formula (1') Related to Present Invention>

The aromatic hydroxycarboxylic acid and/or derivative thereof (A) related to the present invention is a compound represented by general formula (1') below.

[Chem. 9]

(1')

(In formula, Ar, $R_1$, and n are as defined in general formula (1), $R_2$ represents a hydrogen atom or a linear or branched alkylcarbonyl group having 1 to 6 carbon atoms, and $R_3$ represents a hydrogen atom or a linear or branched alkyl group having 1 to 6 carbon atoms.)

Preferred examples of Ar in general formula (1') are the same as in general formula (1).

When Ar in general formula (1') is a phenylene group, the aromatic hydroxycarboxylic acid and/or derivative thereof (A) can be represented as general formula (2') below, and if this is used, a liquid-crystal polyester resin including a repeating unit represented by general formula (2) above will be formed.

[Chem. 10]

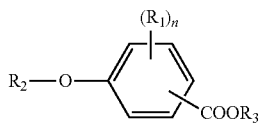

(2')

(In formula, $R_1$, $R_2$, $R_3$, and n are as defined in general formula (1').)

In particular, the structure represented by general formula (3') below is preferred, and if this is used, a liquid-crystal polyester resin including a repeating unit represented by general formula (3) above will be formed.

[Chem. 11]

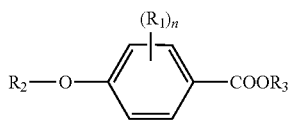

(3')

(In formula, $R_1$, $R_2$, $R_3$, and n are as defined in general formula (1').)

When Ar in general formula (1') is a naphthylene group, the aromatic hydroxycarboxylic acid and/or derivative thereof (A) can be represented as general formula (4') below, and if this is used, a liquid-crystal polyester resin including a repeating unit represented by general formula (4) above will be formed.

[Chem. 12]

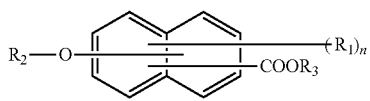

(4')

(In formula, $R_1$, $R_2$, $R_3$, and n are as defined in general formula (1').)

In particular, the structure represented by general formula (5') below is preferred, and if this is used, a liquid-crystal polyester resin including a repeating unit represented by general formula (5) above will be formed.

[Chem. 13]

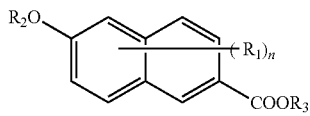

(5')

(In formula, $R_1$, $R_2$, $R_3$, and n are as defined in general formula (1').)

When Ar in general formula (1') is a biphenylene group, the aromatic hydroxycarboxylic acid and/or derivative thereof (A) can be represented as general formula (6') below, and if this is used, a liquid-crystal polyester resin including a repeating unit represented by general formula (6) above will be formed.

[Chem. 14]

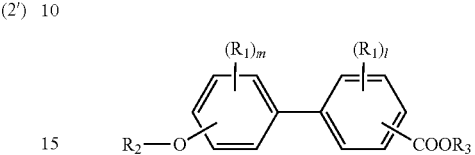

(6')

(In formula, $R_1$, $R_2$, and $R_3$ are as defined in general formula (1'), m and l are each an integer of 0 to 4, and m+l is an integer of 1 to 4.)

In particular, the structure represented by general formula (7') below is preferred, and if this is used, a liquid-crystal polyester resin including a repeating unit represented by general formula (7) above will be formed.

[Chem. 15]

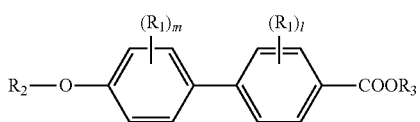

(7')

(In formula, $R_1$, $R_2$, and $R_3$ are as defined in general formula (1'), and m and l are as defined in general formula (6').)

Preferred examples of $R_1$ in general formulae (1') to (7') above are the same as in general formula (1).

$R_2$ in general formulae (1') to (7') above represents a hydrogen atom or a linear or branched alkylcarbonyl group having 1 to 6 carbon atoms. In particular, $R_2$ is preferably a hydrogen atom or a linear or branched alkylcarbonyl group having 1 to 4 carbon atoms, more preferably an alkylcarbonyl group having one carbon atom, namely, an acetyl group, or a linear or branched alkylcarbonyl group having four carbon atoms, particularly preferably an acetyl group.

$R_3$ in general formulae (1') to (7') above represents a hydrogen atom or a linear or branched alkyl group having 1 to 6 carbon atoms. In particular, $R_3$ is preferably a hydrogen atom or a linear or branched alkyl group having 1 to 4 carbon atoms, more preferably a hydrogen atom or an alkyl group having 1 to 2 carbon atoms, particularly preferably an alkyl group having one carbon atom, namely, a methyl group.

Preferred examples of n in general formulae (1') to (5') above are the same as in general formulae (1) to (5). Preferred examples of m and l in general formulae (6') and (7') above are the same as in general formulae (6) and (7).

Specific examples of aromatic hydroxycarboxylic acids represented by general formula (1') include 2-methyl-4-hydroxybenzoic acid, 3-methyl-4-hydroxybenzoic acid, 2,3-dimethyl-4-hydroxybenzoic acid, 2,5-dimethyl-4-hydroxybenzoic acid, 2,6-dimethyl-4-hydroxybenzoic acid, 3,5-dimethyl-4-hydroxybenzoic acid, 3,6-dimethyl-4-hydroxybenzoic acid, 2,3,5-trimethyl-4-hydroxybenzoic acid, 2,3,6-trimethyl-4-hydroxybenzoic acid, 2,3,5,6-tetramethyl-4-hydroxybenzoic acid, 2,6-dibutyl-4-hydroxybenzoic acid, 5-butyl-4-hydroxy-2-methylbenzoic acid, 5-cyclohexyl-4-hydroxy-2-methylbenzoic acid, 2-methyl-3-hydroxybenzoic acid, 4-methyl-3-hydroxybenzoic acid, 5-methyl-3-hydroxybenzoic acid, 6-methyl-3-hydroxybenzoic acid, 2,4-dimethyl-3-hydroxybenzoic acid, 2,5-dimethyl-3-hydroxybenzoic acid, 2,6-dimethyl-3-hydroxybenzoic acid, 4,5-dimethyl-3-hydroxybenzoic acid, 4,6-dimethyl-3-hydroxybenzoic acid, 5,6-dimethyl-3-hydroxybenzoic acid, 2,4,5-trimethyl-3-hydroxybenzoic acid, 2,4,6-trimethyl-3-hydroxybenzoic acid, 2,5,6-trimethyl-3-hydroxybenzoic acid, 4,5,6-trimethyl-3-hydroxybenzoic acid, 2,4,5,6-tetramethyl-3-hydroxybenzoic acid, 6-hydroxy-3-methyl-2-naphthoic acid, 6-hydroxy-4-methyl-2-naphthoic acid, 6-hydroxy-5-methyl-2-naphthoic acid, 6-hydroxy-7-methyl-2-naphthoic acid, 6-hydroxy-8-methyl-2-naphthoic acid, 6-hydroxy-1,3-dimethyl-2-naphthoic acid, 6-hydroxy-1,4-dimethyl-2-naphthoic acid, 6-hydroxy-1,5-dimethyl-2-naphthoic acid, 6-hydroxy-1,7-dimethyl-2-naphthoic acid, 6-hydroxy-1,8-dimethyl-2-naphthoic acid, 6-hydroxy-3,4-dimethyl-2-naphthoic acid, 6-hydroxy-3,5-dimethyl-2-naphthoic acid, 6-hydroxy-3,7-dimethyl-2-naphthoic acid, 6-hydroxy-3,8-dimethyl-2-naphthoic acid, 6-hydroxy-4,5-dimethyl-2-naphthoic acid, 6-hydroxy-4,7-dimethyl-2-naphthoic acid, 6-hydroxy-4,8-dimethyl-2-naphthoic acid, 6-hydroxy-5,7-dimethyl-2-naphthoic acid, 6-hydroxy-5,8-dimethyl-2-naphthoic acid, 6-hydroxy-1,3,4-trimethyl-2-naphthoic acid, 6-hydroxy-1,3,5-trimethyl-2-naphthoic acid, 6-hydroxy-1,3,7-trimethyl-2-naphthoic acid, 6-hydroxy-1,3,8-trimethyl-2-naphthoic acid, 6-hydroxy-1,4,5-trimethyl-2-naphthoic acid, 6-hydroxy-1,4,7-trimethyl-2-naphthoic acid, 6-hydroxy-1,4,8-trimethyl-2-naphthoic acid, 6-hydroxy-1,5,7-trimethyl-2-naphthoic acid, 6-hydroxy-1,5,8-trimethyl-2-naphthoic acid, 6-hydroxy-1,7,8-trimethyl-2-naphthoic acid, 6-hydroxy-3,4,5-trimethyl-2-naphthoic acid, 6-hydroxy-3,4,7-trimethyl-2-naphthoic acid, 6-hydroxy-3,4,8-trimethyl-2-naphthoic acid, 6-hydroxy-3,5,7-trimethyl-2-naphthoic acid, 6-hydroxy-3,5,8-trimethyl-2-naphthoic acid, 6-hydroxy-3,7,8-trimethyl-2-naphthoic acid, 6-hydroxy-4,5,7-trimethyl-2-naphthoic acid, 6-hydroxy-4,5,8-trimethyl-2-naphthoic acid, 6-hydroxy-4,7,8-trimethyl-2-naphthoic acid, 6-hydroxy-5,7,8-trimethyl-2-naphthoic acid, 6-hydroxy-1,3,4,5-tetramethyl-2-naphthoic acid, 6-hydroxy-1,3,4,7-tetramethyl-2-naphthoic acid, 6-hydroxy-1,3,4,8-tetramethyl-2-naphthoic acid, 6-hydroxy-1,4,5,7-tetramethyl-2-naphthoic acid, 6-hydroxy-1,4,5,8-tetramethyl-2-naphthoic acid, 6-hydroxy-1,4,7,8-tetramethyl-2-naphthoic acid, 6-hydroxy-1,5,7,8-tetramethyl-2-naphthoic acid, 6-hydroxy-3,4,5,7-tetramethyl-2-naphthoic acid, 6-hydroxy-3,4,5,8-tetramethyl-2-naphthoic acid, 6-hydroxy-3,5,7,8-tetramethyl-2-naphthoic acid, 6-hydroxy-4,5,7,8-tetramethyl-2-naphthoic acid, 4-(2-methyl-4-hydroxyphenyl)benzoic acid, 4-(3-methyl-4-hydroxyphenyl)benzoic acid, 4-(5-methyl-4-hydroxyphenyl)benzoic acid, 4-(6-methyl-4-hydroxyphenyl)benzoic acid, 2-methyl-4-(4-hydroxyphenyl)benzoic acid, 3-methyl-4-(4-hydroxyphenyl)benzoic acid, 5-methyl-4-(4-hydroxyphenyl)benzoic acid, and 6-methyl-4-(4-hydroxyphenyl)benzoic acid.

Specific examples of aromatic hydroxycarboxylic acid derivatives represented by general formula (1') include 2-methyl-4-acetoxybenzoic acid, 3-methyl-4-acetoxybenzoic acid, 2,3-dimethyl-4-acetoxybenzoic acid, 2,5-dimethyl-4-acetoxybenzoic acid, 2,6-dimethyl-4-acetoxybenzoic acid, 3,5-dimethyl-4-acetoxybenzoic acid, 3,6-dimethyl-4-acetoxybenzoic acid, 2,3,5-trimethyl-4-acetoxybenzoic acid, 2,3,6-trimethyl-4-acetoxybenzoic acid, 2,3,5,6-tetramethyl-4-acetoxybenzoic acid, 2,6-dibutyl-4-acetoxybenzoic acid, 5-butyl-4-acetoxy-2-methylbenzoic acid, 5-cyclohexyl-4-acetoxy-2-methylbenzoic acid, methyl 2-methyl-4-hydroxybenzoate, methyl 3-methyl-4-hydroxybenzoate, methyl 2,3-dimethyl-4-hydroxybenzoate, methyl 2,5-dimethyl-4-hydroxybenzoate, methyl 2,6-dimethyl-4-hydroxybenzoate, methyl 3,5-dimethyl-4-hydroxybenzoate, methyl 3,6-dimethyl-4-hydroxybenzoate, methyl 2,3,5-trimethyl-4-hydroxybenzoate, methyl 2,3,6-trimethyl-4-hydroxybenzoate, methyl 2,3,5,6-tetramethyl-4-hydroxybenzoate, methyl 2,6-dibutyl-4-hydroxybenzoate, methyl 5-butyl-4-hydroxy-2-methylbenzoate, methyl 5-cyclohexyl-4-hydroxy-2-methylbenzoate, ethyl 2,6-dibutyl-4-hydroxybenzoate, ethyl 5-butyl-4-hydroxy-2-methylbenzoate, ethyl 5-cyclohexyl-4-hydroxy-2-methylbenzoate, ethyl 2-methyl-4-hydroxybenzoate, ethyl 3-methyl-4-hydroxybenzoate, ethyl 2,3-dimethyl-4-hydroxybenzoate, ethyl 2,5-dimethyl-4-hydroxybenzoate, ethyl 2,6-dimethyl-4-hydroxybenzoate, ethyl 3,5-dimethyl-4-hydroxybenzoate, ethyl 3,6-dimethyl-4-hydroxybenzoate, ethyl 2,3,5-trimethyl-4-hydroxybenzoate, ethyl 2,3,6-trimethyl-4-hydroxybenzoate, ethyl 2,3,5,6-tetramethyl-4-hydroxybenzoate, methyl 2-methyl-4-acetoxybenzoate, methyl 3-methyl-4-acetoxybenzoate, methyl 2,3-dimethyl-4-acetoxybenzoate, methyl 2,5-dimethyl-4-acetoxybenzoate, methyl 2,6-dimethyl-4-acetoxybenzoate, methyl 3,5-dimethyl-4-acetoxybenzoate, methyl 3,6-dimethyl-4-acetoxybenzoate, methyl 2,3,5-trimethyl-4-acetoxybenzoate, methyl 2,3,6-trimethyl-4-acetoxybenzoate, methyl 2,3,5,6-tetramethyl-4-acetoxybenzoate, methyl 2,6-dibutyl-4-acetoxybenzoate, methyl 5-butyl-4-acetoxy-2-methylbenzoate, methyl 5-cyclohexyl-4-acetoxy-2-methylbenzoate, ethyl 2-methyl-4-acetoxybenzoate, ethyl 3-methyl-4-acetoxybenzoate, ethyl 2,3-dimethyl-4-acetoxybenzoate, ethyl 2,5-dimethyl-4-acetoxybenzoate, ethyl 2,6-dimethyl-4-acetoxybenzoate, ethyl 3,5-dimethyl-4-acetoxybenzoate, ethyl 3,6-dimethyl-4-acetoxybenzoate, ethyl 2,3,5-trimethyl-4-acetoxybenzoate, ethyl 2,3,6-trimethyl-4-acetoxybenzoate, ethyl 2,3,5,6-tetramethyl-4-acetoxybenzoate, ethyl 2,6-dibutyl-4-acetoxybenzoate, ethyl 5-butyl-4-acetoxy-2-methylbenzoate, ethyl 5-cyclohexyl-4-acetoxy-2-methylbenzoate, 6-acetoxy-3-methyl-2-naphthoic acid, 6-acetoxy-4-methyl-2-naphthoic acid, 6-acetoxy-5-methyl-2-naphthoic acid, 6-acetoxy-7-methyl-2-naphthoic acid, 6-acetoxy-8-methyl-2-naphthoic acid, methyl 6-hydroxy-3-methyl-2-naphthoate, methyl 6-hydroxy-4-methyl-2-naphthoate, methyl 6-hydroxy-5-methyl-2-naphthoate, methyl 6-hydroxy-7-methyl-2-naphthoate, methyl 6-hydroxy-8-methyl-2-naphthoate, ethyl 6-hydroxy-3-methyl-2-naphthoate, ethyl 6-hydroxy-4-methyl-2-naphthoate, ethyl 6-hydroxy-5-methyl-2-naphthoate, ethyl 6-hydroxy-7-methyl-2-naphthoate, ethyl 6-hydroxy-8-methyl-2-naphthoate, methyl 6-acetoxy-3-methyl-2-naphthoate, methyl 6-acetoxy-4-methyl-2-naphthoate, methyl 6-acetoxy-5-methyl-2-naphthoate, methyl 6-acetoxy-7-methyl-2-naphthoate, methyl 6-acetoxy-8-methyl-2-naphthoate, ethyl 6-acetoxy-3-methyl-2-naphthoate, ethyl 6-acetoxy-4-methyl-2-naphthoate, ethyl 6-acetoxy-5-methyl-2-naphthoate, ethyl 6-acetoxy-7-methyl-2-naphthoate, ethyl 6-acetoxy-8-methyl-2-naphthoate, 2-methyl-4-hydroxy-4'-biphenylcarboxylic acid, 3-methyl-4-hydroxy-4'-biphenylcarboxylic acid, 2,5-dimethyl-4-hydroxy-4'-biphenylcarboxylic acid, 2,5-dibutyl-4-hydroxy-4'-biphenylcarboxylic acid, 2,2'-dimethyl-4-hydroxy-4'-biphenylcarboxylic acid, 2-methyl-4-acetoxy-4'-biphenylcarboxylic acid, 3-methyl-4-acetoxy-4'-biphenylcarboxylic acid, 2,5-dimethyl-4-acetoxy-4'-biphenylcarboxylic acid, 2,5-dibutyl-4-acetoxy-4'-biphenylcarboxylic acid, 2,2'-dimethyl-4-acetoxy-4'- biphenylcarboxylic acid, 2-methyl-4-hydroxy-4'-biphenylcarboxylic acid methyl ester, 3-methyl-4-hydroxy-4'-biphenylcarboxylic acid methyl ester, 2,5-dimethyl-4-hydroxy-4'-biphenylcarboxylic acid methyl ester, 2,5-dibutyl-4-hydroxy-4'-biphenylcarboxylic acid methyl ester, 2,2'-dimethyl-4-hydroxy-4'-biphenylcarboxylic acid methyl ester, 4-(2-methyl-4-acetoxyphenyl)benzoic acid, 4-(3-methyl-4-acetoxyphenyl)benzoic acid, 4-(5-methyl-4-acetoxyphenyl)benzoic acid, 4-(6-methyl-4-acetoxyphenyl)benzoic acid, 2-methyl-4-(4-acetoxyphenyl)benzoic acid, 3-methyl-4-(4-acetoxyphenyl)benzoic acid, 5-methyl-4-(4-acetoxyphenyl)benzoic acid, 6-methyl-4-(4-acetoxyphenyl)benzoic acid, methyl 4-(2-methyl-4-hydroxyphenyl)benzoate, methyl 4-(3-methyl-4-hydroxyphenyl)benzoate, methyl 4-(5-methyl-4-hydroxyphenyl)benzoate, methyl 4-(6-methyl-4-hydroxyphenyl)benzoate, methyl 2-methyl-4-(4-hydroxyphenyl)benzoate, methyl 3-methyl-4-(4-hydroxyphenyl)benzoate, methyl 5-methyl-4-(4-hydroxyphenyl)benzoate, methyl 6-methyl-4-(4-hydroxyphenyl)benzoate, ethyl 4-(2-methyl-4-hydroxyphenyl)benzoate, ethyl 4-(3-methyl-4-hydroxyphenyl)benzoate, ethyl 4-(5-methyl-4-hydroxyphenyl)benzoate, ethyl 4-(6-methyl-4-hydroxyphenyl)benzoate, ethyl 2-methyl-4-(4-hydroxyphenyl)benzoate, ethyl 3-methyl-4-(4-hydroxyphenyl)benzoate, ethyl 5-methyl-4-(4-hydroxyphenyl)benzoate, ethyl 6-methyl-4-(4-hydroxyphenyl)benzoate, methyl 4-(2-methyl-4-acetoxyphenyl)benzoate, methyl 4-(3-methyl-4-acetoxyphenyl)benzoate, methyl 4-(5-methyl-4-acetoxyphenyl)benzoate, methyl 4-(6-methyl-4-acetoxyphenyl)benzoate, methyl 2-methyl-4-(4-acetoxyphenyl)benzoate, methyl 3-methyl-4-(4-acetoxyphenyl)benzoate, methyl 5-methyl-4-(4-acetoxyphenyl)benzoate, methyl 6-methyl-4-(4-acetoxyphenyl)benzoate, ethyl 4-(2-methyl-4-acetoxyphenyl)benzoate, ethyl 4-(3-methyl-4-acetoxyphenyl)benzoate, ethyl 4-(5-methyl-4-acetoxyphenyl)benzoate, ethyl 4-(6-methyl-4-acetoxyphenyl)benzoate, ethyl 2-methyl-4-(4-acetoxyphenyl)benzoate, ethyl 3-methyl-4-(4-acetoxyphenyl)benzoate, ethyl 5-methyl-4-(4-acetoxyphenyl)benzoate, and ethyl 6-methyl-4-(4-acetoxyphenyl)benzoate.

<Regarding Other Aromatic Hydroxycarboxylic Acid (B)>

Specific examples of compounds that can be used as the other aromatic hydroxycarboxylic acid (B) include p-hydroxybenzoic acid, m-hydroxybenzoic acid, 6-hydroxy-2-naphthoic acid, and 4-hydroxy-4'-biphenylcarboxylic acid.

<Regarding Other Polycondensation Components>

In polycondensing the aromatic hydroxycarboxylic acid and/or derivative thereof (A) represented by general formula (1') with the other aromatic hydroxycarboxylic acid (B) to obtain the liquid-crystal polyester resin according to the production method of the present invention, components such as a dihydroxy compound (C), a dicarboxylic acid compound (D), an aliphatic diol (E), and an aliphatic dicarboxylic acid (F) can be further used in combination.

Specific examples of compounds that can be used as a dihydroxy compound (C) include hydroquinone, resorcinol, 2,6-naphthalenediol, 1,5-naphthalenediol, 4,4'-dihydroxybiphenyl, 4,4'-dihydroxy-3,3'-dimethylbiphenyl, 4,4'-dihydroxy-3,3',5,5'-tetramethylbiphenyl, 4,4'-dihydroxy-2,2',3,3',5,5'-hexamethylbiphenyl, 2,2'-bis(4-hydroxyphenyl)isopropyl, 2,7-dihydroxyanthraquinone, bis(4-hydroxyphenyl)sulfone, 4,4'-dihydroxybenzophenone, and carboxylic acid ester derivatives thereof.

Specific examples of compounds that can be used as the dicarboxylic acid compound (D) include terephthalic acid, isophthalic acid, 2,6-naphthalenedicarboxylic acid, 1,5-naphthalenedicarboxylic acid, 4,4'-biphenyldicarboxylic acid, 4,4'-dicarboxydiphenyl ether, 4,4'-dicarboxydiphenyl sulfide, 1,2-bis(4-carboxyphenoxy) ethylene, and ester derivatives thereof.

As a compound that can be used as the aliphatic diol (E), specifically, an aliphatic diol represented by general formula (8) below can be used.

[Chem. 16]

$$R_2O—R_4—OR_2 \quad (8)$$

(In formula, $R_4$ represents an alkylene group having 2 to 12 carbon atoms, and $R_2$ is as defined in general formula (1').)

Specific examples include ethylene glycol, propylene glycol, and carboxylic acid ester derivatives thereof.

As a compound that can be used as the aliphatic dicarboxylic acid (F), specifically, an aliphatic dicarboxylic acid represented by general formula (9) below can be used.

[Chem. 17]

$$R_3OOC—R_5—COOR_3 \quad (9)$$

(In formula, $R_5$ represents an alkylene group having 2 to 12 carbon atoms, and $R_3$ is as defined in general formula (1').)

Specific examples include malonic acid, succinic acid, glutaric acid, adipic acid, pimelic acid, suberic acid, azelaic acid, sebacic acid, and ester derivatives thereof.

In the liquid-crystal polyester resin including a repeating unit represented by general formula (1), the content of the component (A), relative to the total content of the component (A) and the other aromatic hydroxycarboxylic acid (B), is in the range from a lower limit of 1 mol % or more, preferably 3 mol % or more, more preferably 5 mol % or more, still more preferably 7 mol % or more to an upper limit of 50 mol % or less, preferably 45 mol % or less, more preferably 40 mol % or less, still more preferably 35 mol % or less. If the content of the component (A) is less than 1 mol %, the effect of improving surface wetting tension obtained by performing an oxidation treatment on a surface of a liquid-crystal polyester resin formed body will be insufficient, which is undesirable. If the content of the component (A) is more than 50 mol %, the physical properties of the liquid-crystal polyester, such as heat resistance and mechanical strength, will be degraded, which is undesirable.

In the liquid-crystal polyester resin including a repeating unit represented by general formula (1), when the component (A) and the component (B), and, furthermore, the component (C), the component (D), the component (E), and the component (F) are used in combination, the content of the component (A), relative to the total content of the components (A) to (F), is in the range from a lower limit of 1 mol % or more, preferably 3 mol % or more, more preferably 5 mol % or more, still more preferably 7 mol % or more to an upper limit of 50 mol % or less, preferably 45 mol % or less, more preferably 40 mol % or less, still more preferably 35 mol % or less. Also in this case, if the content of the component (A) is less than 1 mol %, the effect obtained by performing an oxidation treatment on a surface of a liquid-crystal polyester resin formed body will be insufficient. If the content of the component (A) is more than 50 mol %, the physical properties of the liquid-crystal polyester resin, such as heat resistance and mechanical strength, will be degraded, which is undesirable.

<Regarding Method for Producing Liquid-Crystal Polyester Resin>

The method for producing the liquid-crystal polyester resin including a repeating unit represented by general formula (1) related to the present invention is not particularly limited. The liquid-crystal polyester resin can be produced in accordance with a known polycondensation method for a liquid-crystal polyester resin. Industrially, the liquid-crystal polyester resin can be produced, for example, by a polycondensation reaction using a transesterification method.

For example, when the liquid-crystal polyester resin is produced from the aromatic hydroxycarboxylic acid and/or derivative thereof (A) represented by general formula (1') and the other aromatic hydroxycarboxylic acid (B), the liquid-crystal polyester resin may be produced by, for example, acylating a phenolic hydroxyl group using a fatty acid anhydride and then performing a de-fatty acid polycondensation reaction. When it is desired to increase the molecular weight of the liquid-crystal polyester resin for a higher melting point and higher mechanical strength, solid phase polymerization may be performed in an inert gas atmosphere under reduced pressure.

The reaction temperature in the above acylation is preferably in the range of 100° C. to 160° C., more preferably 140° C. or higher. If this reaction temperature is excessively low, the acylation may proceed insufficiently to leave behind the monomers in a polymerization product, which is undesirable.

The above de-fatty acid polycondensation reaction is preferably performed in the range of 100° C. to 350° C., more preferably in the range of 150° C. to 310° C. If this reaction temperature is low, the polymerization will not proceed sufficiently, which is undesirable. The reaction pressure may be normal pressure or reduced pressure, and is preferably reduced pressure (about 10.0 kPa) in order to distill volatiles (e.g., acetic acid, water, and alcohols) formed as by-products out of the reaction system.

Although the polycondensation reaction of the liquid-crystal polyester resin proceeds in the absence of catalyst, an acetic acid metal salt, titanium alkoxide, magnesium oxide, or the like can be used.

The melting point of the liquid-crystal polyester resin including a repeating unit represented by general formula (1) related to the present invention is preferably 200° C. or higher, more preferably 210° C. or higher, still more preferably 220° C. or higher. The melting point of the liquid-crystal polyester resin can be determined by, for example, differential scanning calorimetry.

<Regarding Liquid-Crystal Polyester Resin Formed Body>

The method for obtaining the liquid-crystal polyester resin formed body having a repeating unit represented by general formula (1) related to the present invention is not particularly limited, and a known method can be used.

When a laminate is produced, a liquid-crystal polyester formed body having a block shape, a plate shape, a sheet shape, a film shape, or other shape can be obtained by, for example, forming a liquid-crystal polyester in a molten state after completion of the polycondensation reaction by extrusion molding or injection molding, forming a liquid-crystal polyester resin dissolved in a solvent by solution casting, or press forming a powdered liquid-crystal polyester resin.

When fibers are produced, they can be obtained by, for example, pulverizing a liquid-crystal polyester resin in a molten state after completion of the polycondensation reaction as it is or after being formed into a plate shape, a sheet shape, or other shape, melting the resulting powdery product, and performing melt spinning. To obtain fibers with higher strength and a higher modulus of elasticity, the spun fibers may be heat treated in an inert gas or in vacuum, and is preferably heat treated.

The liquid-crystal polyester formed body can also be obtained in the form of, for example, a filament yarn obtained by spinning of fibers obtained by melt spinning, a fabric woven from fibers or yarns, a nonwoven fabric obtained by deposition of fibers.

The liquid-crystal polyester resin formed body related to the present invention may be a formed body composed only of the liquid-crystal polyester resin including a repeating unit represented by general formula (1) or a formed body composed of an alloy of the liquid-crystal polyester resin as the principal component and other thermoplastic resins. Examples of other thermoplastic resins that can be used include polypropylene, polyethylene, polybutylene terephthalate, nylon 6, nylon 66, polyphenylene sulfide, polycarbonate, polyphenylene ether, and liquid-crystal polyester resins other than the liquid-crystal polyester resin related to the present invention.

<Regarding Step (I) of Performing Oxidation Treatment>

The production method of the present invention includes a step (I) of performing an oxidation treatment on a surface of the liquid-crystal polyester resin formed body. The oxidation treatment in the step (I) of the present invention may be performed by any method that can produce the advantageous effects of the present invention, and a known method can be used. For example, a plasma treatment, a corona treatment, an ultraviolet (UV) irradiation treatment, a flame treatment, an electron beam treatment, a chemical treatment with an oxidizing agent, or a heat treatment in the presence of oxygen may be used.

In the plasma treatment, a gas introduced into an apparatus is converted into the plasma state in the ambient atmosphere or under reduced pressure by barrier discharge using a dielectric disposed on a surface of an electrode such as a parallel plate electrode or a coaxial cylinder electrode or by application of a high-frequency wave or a microwave, and the resulting plasma is applied to the formed body, whereby the oxidation treatment of the formed body surface can be performed. The plasma treatment performed under atmospheric pressure does not require time for decompression or any large-scale equipment such as a vacuum chamber and is suitable for continuous treatment, and thus is preferred as an oxidation treatment in the present invention.

In the corona treatment, the formed body is disposed between an insulated electrode and a counter electrode, a high-frequency high voltage is applied to generate corona discharge, and a gas component excited or dissociated by the corona discharge is applied to the formed body, whereby the oxidation treatment of the formed body surface can be performed.

In the ultraviolet (UV) irradiation treatment, the formed body surface is irradiated with ultraviolet radiation using an ultraviolet irradiator that can emit short-wavelength ultraviolet radiation (e.g., wavelength: about 100 to 290 nm), whereby the oxidation treatment of the formed body surface can be performed. The ultraviolet irradiator may be, for example, a low-pressure mercury lamp, a KrCl excimer lamp, or a $Xe_2$ excimer lamp.

In the flame treatment, gas molecules are converted into plasma with the heat and temperature of a flame, and the oxidation treatment of the formed body surface can be performed by the same action as in the plasma treatment.

The electron beam treatment is performed by irradiating the formed body surface with an electron beam generated using an electron linear accelerator. The atmosphere for the electron beam irradiation treatment may be the ambient atmosphere or an atmosphere in which the concentration of oxygen is adjusted with, for example, an inert gas (e.g., nitrogen). The electron beam irradiation may be performed using a high-energy type electron beam irradiator that emits an electron beam at an energy of 100 keV to 400 keV or a low-energy type electron beam irradiator that emits an electron beam at an energy of 100 keV or less, and an irradiator of any irradiation type such as scanning type or curtain type may be used. For example, a curtain type electron beam irradiator (LB1023 manufactured by EYE ELECTRON BEAM CO., LTD.) or a line-irradiation type low-energy electron beam irradiator (EB-ENGINE (registered trademark) manufactured by Hamamatsu Photonics K.K.) can be used.

In the chemical treatment with an oxidizing agent, a chemical solution containing an oxidizing agent is brought into contact with the formed body surface, whereby the oxidation treatment of the formed body surface can be performed. Examples of oxidizing agents that can be used include permanganates such as potassium permanganate and sodium permanganate and chromic acids such as chromic acid mixtures of potassium dichromate and sulfuric acid.

In the heat treatment in the presence of oxygen, heat is applied to the liquid-crystal polyester formed body in an oxygen-containing atmosphere, for example, the ambient atmosphere, whereby the oxidation treatment of the formed body surface can be performed.

By performing an oxidation treatment on the surface of the formed body obtained using the liquid-crystal polyester resin related to the present invention, as compared to when conventional liquid-crystal polyesters are used, good surface wettability can be provided even if the oxidation treatment time in the step (I) is short, thus enabling efficient production of a laminate and improvement in colorability of the liquid-crystal polyester resin difficult to dye. Thus, the present invention is useful.

Here, the improvement in wettability of the liquid-crystal polyester resin formed body surface is probably due to the following reason: in the liquid-crystal polyester resin having a repeating unit represented by general formula (1) according to the present invention, the alkyl group ($R_1$) bonded to Ar in general formula (1) is converted to an oxidized polar group by the oxidation treatment in the step (I).

<Regarding Step (II) of Stacking Resin Layer or Metal Layer on Surface on which Oxidation Treatment has been Performed to Produce Laminate>

The production method of the present invention may further include, after the oxidation treatment in the step (I), a step (II) of stacking a resin layer or a metal layer on the surface on which the oxidation treatment has been performed to produce a laminate.

Specific examples of the resin layer stacked in the step (II) include resin layers formed of saturated polyester resins, polysulfone resins, polytetrafluoroethylene resins, polyimide resins, polyester imide resins, polyetherimide resins, polyamide-imide resins, polyamide resins, polyphenylene ether resins, polyethersulfone resins, polyether ketone resins, polythioether ketone resins, polyether ether ketone resins, thermoplastic polyurethane resins, polyolefin resins, ABS resins, polyamide elastomers, polyester elastomers, epoxy resins, novolac resins, benzoxazin resins, BT resins, and silicone resins. These resins for use can be used also when they are resin compositions containing desired additives and fillers.

The method of stacking the resin layer in the step (II) is not particularly limited, and a known method can be used. For example, on the formed body surface treated in the step (I) of performing an oxidation treatment on a surface of the liquid-crystal polyester resin formed body in the present invention, the resin layer may be formed by a casting method, thermocompression bonding of a film resin, or application of an uncured liquid thermosetting resin and heat curing thereof.

Specific examples of the metal layer stacked in the step (II) include copper, gold, silver, nickel, and aluminum, among which copper is suitable.

The method of stacking the metal layer in step (II) is not particularly limited, and a known method can be used. For example, on the formed body surface treated in the step (I) of performing an oxidation treatment on the liquid-crystal polyester resin formed body surface related to the present invention, the metal layer may be stacked by thermocompression bonding of metal foil, vapor deposition, electroless plating, or electrolytic plating.

Alternatively, the metal layer may be stacked on an adhesive resin layer stacked on the surface of the liquid-crystal polyester formed body, but the metal layer is preferably stacked on the surface of the liquid-crystal polyester formed body without forming an adhesive resin layer.

<Regarding Step (III) of Coloring Surface on which Oxidation Treatment has been Performed to Produce Colored Liquid-Crystal Polyester Fibers>

The production method of the present invention may include a step (III) of coloring the surface on which the oxidation treatment has been performed to produce colored liquid-crystal polyester fibers. In particular, coloration using a pigment having a cationic group can provide binding to the modified surface of the liquid-crystal polyester resin formed body after the oxidation treatment, thus providing a colored liquid-crystal polyester processed product.

The pigment having a cationic group can be selected from known pigment compounds having at least one cationic group. Examples include C.I. Basic Red 1 (rhodamine 6GCP), 8 (rhodamine G), C.I. Basic Violet 10 (rhodamine B), C.I. Basic Violet 11, C.I. Basic Blue 1 (Basic Cyanine 6G), Basic Blue 5 (Basic Cyanine EX), Basic Blue 7 (Victoria Pure Blue BO), Basic Blue 25 (Basic Blue GO), Basic Blue 26 (Victoria Blue Bconc.), C.I. Basic Green 1 (Brilliant Green GX), Basic Green 4 (malachite green), C.I. Basic Violet 1 (methyl violet), C.I. Basic Violet 3 (crystal violet), C.I. Basic Violet 14 (Magenta), Lauth's Violet, methylene blue, methylene green B, C.I. Basic Blue 9, C.I. Basic Blue 17, C.I. Basic Blue 24, C.I. Basic Yellow 1, C.I. Basic Violet 44, C.I. Basic Violet 46, C.I. Basic Blue 116, C.I. Basic Yellow 11, 12, 13, 14, 21, 22, 23, 24, 28, 29, 33, 35, 40, 43, 44, 45, 48, 49, 51, 52, 53, C.I. Basic Red 12, 13, 14, 15, 27, 35, 36, 37, 45, 48, 49, 52, 53, 66, 68, C.I. Basic Violet 7, 15, 16, 20, 21, 39, 40, C.I. Basic Orange 27, 42, 44, 46, and C.I. Basic Blue 62, 63.

EXAMPLES

The present invention will now be described more specifically with reference to Examples, but it should be noted that the present invention is not limited to these Examples.

The melting point and the wetting tension were measured by the following methods.

[Method of Analysis]
1. Measurement of Melting Point (Differential Scanning Calorimetry: DSC)

About 10 mg of a crystal was weighed into an aluminum pan, and using a differential scanning calorimeter (DSC-60 manufactured by Shimadzu Corporation), the measurement was performed under the following operating conditions using aluminum oxide as a control.

(Operating Conditions)

Heating rate: 20° C./min

Measurement temperature range: 40° C. to 320° C.

Measurement atmosphere: nitrogen, 50 mL/min

2. Measurement of Wetting Tension

The wetting tension of a surface-treated resin surface was measured according to JIS K 6768. A wetting tension test mixture (manufactured by FUJIFILM Wako Pure Chemical Corporation) was used as a test solution. The test solution was applied to a test piece with a cotton swab, and the wettability of the surface was visually observed to measure the wetting tension. The test was performed multiple times to ensure reproducibility.

Example 1

A reaction vessel equipped with a stirring blade and a distillation pipe was charged with 65.6 g of p-hydroxybenzoic acid, 72.3 g of 4-hydroxy-2-methylbenzoic acid, 65.9 g of 6-hydroxy-2-naphthoic acid, and 135.5 g of acetic anhydride, and an acetylation reaction was carried out at 150° C. for 3 hours. The temperature was then increased to 310° C. over 4 hours. At 310° C., the pressure was reduced to 10 kPa over 15 minutes, and polymerization was carried out for 1 hour. As a result, a liquid-crystal polyester resin having a melting point of 246° C. (by differential scanning calorimetry) was obtained. The reaction formula is shown below.

[Chem. 18]

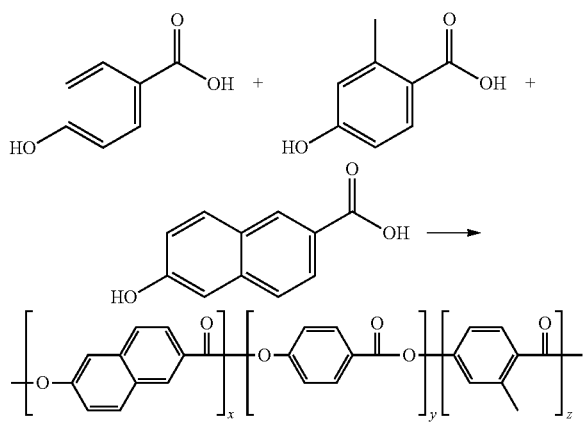

(In formula, x, y, and z are 0.270, 0.365, and 0.365, respectively.)

The liquid-crystal polyester resin obtained by synthesis was pulverized, and using a pressing machine (TOYOSEIKI MINI TEST PRESS, model: MP-2FH), a SUS304 stainless steel mold for resin pressing, and a polyimide film (manufactured by Ube Industries, Ltd.), a uniformly smooth liquid-crystal polyester resin sheet having a thickness of 1 mm was fabricated. The resin sheet was cut to a predetermined size to prepare a test piece.

The test piece prepared was irradiated with atmospheric pressure plasma generated by dielectric barrier discharge for a certain period of time using a plasma treatment tester (manufactured by Alpha Co., Ltd., model: PTM-100-9kVS-V2, frequency: 20 kHz, output voltage: 9 kV, rated capacity: 80 W, treatment distance: 2.5 mm), thereby being surface treated.

The wetting tension of the surface-treated resin surface was then measured according to JIS K 6768. A wetting tension test mixture (manufactured by FUJIFILM Wako Pure Chemical Corporation) was used as a test solution. The test solution was applied to the test piece with a cotton swab, and the wettability of the surface was visually observed to measure the wetting tension.

Example 2

Synthesis of a liquid-crystal polyester resin was performed in the same manner as in Example 1 except that 117.4 g of p-hydroxybenzoic acid, 14.5 g of 4-hydroxy-2-methylbenzoic acid, 65.9 g of 6-hydroxy-2-naphthoic acid, and 135.7 g of acetic anhydride were used, to obtain a liquid-crystal polyester resin having a melting point of 256° C. (by differential scanning calorimetry). The same forming, treatment, and evaluation as in Example 1 were then performed.

[Chem. 19]

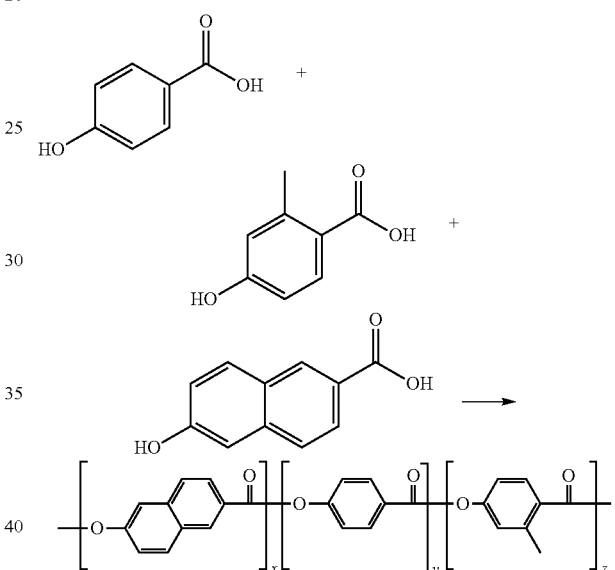

(In formula, x, y, and z are 0.270, 0.656, and 0.074, respectively.)

Comparative Example 1

Synthesis of a liquid-crystal polyester resin was performed in the same manner as in Example 1 except that 131.1 g of p-hydroxybenzoic acid, 66.1 g of 6-hydroxy-2-naphthoic acid, and 135.4 g of acetic anhydride were used and 4-hydroxy-2-methylbenzoic acid was not used, to obtain a liquid-crystal polyester resin having a melting point of 279° C. (by differential scanning calorimetry). The same forming, treatment, and evaluation as in Example 1 were then performed. The reaction formula is shown below.

[Chem. 20]

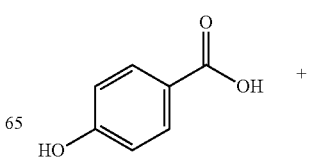

-continued

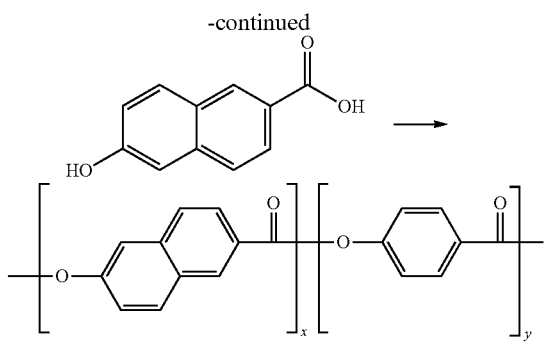

(In formula, x and y are 0.270 and 0.730, respectively.)

The results of the evaluation of the wetting tension of the surface-treated resin surfaces of Examples 1 and 2 and Comparative Example 1 are shown in Table 1 and FIG. 1 below.

TABLE 1

|  | Plasma treatment time (s) | Surface wetting tension (mN/m) |
|---|---|---|
| Example 1 | untreated | 44 |
|  | 0.2 | 59 |
|  | 0.5 | 59 |
| Example 2 | untreated | 44 |
|  | 0.2 | 58 |
|  | 0.5 | 59 |
| Comparative Example 1 | untreated | 37 |
|  | 0.2 | 46 |
|  | 0.5 | 44 |
|  | 2 | 54 |

The results in Table 1 show that in Examples 1 and 2, in which the oxidation treatment was performed on a surface of the liquid-crystal polyester resin formed body including a repeating unit represented by general formula (1) of the present invention, the surface wetting tension was dramatically improved with a treatment performed for so short a time as 0.2 seconds.

In contrast, in Comparative Example 1, in which the oxidation treatment was performed on a surface of a conventional liquid-crystal polyester resin formed body derived from p-hydroxybenzoic acid having no alkyl groups, the surface wetting tension was lower than those in Examples 1 and 2 even when the treatment time was 2 seconds.

When the time of the oxidation treatment on a liquid-crystal polyester resin formed body surface is long, the molecular chain of the liquid-crystal polyester resin is damaged to weaken the formed body, and thus long-term reliability is lost, and a preferred liquid-crystal polyester processed product cannot be obtained. Probably, if the surface is modified to have improved adhesion in the short term, the surface of the weakened material is easily deteriorated by, for example, heating or cooling during use, and the adhesion and colorability cannot be maintained.

The above results show that by using the liquid-crystal polyester resin formed body including a repeating unit represented by general formula (1) of the present invention, the surface wetting tension is dramatically improved in a shorter time than in conventional cases, and, for example, when a laminate is formed as a liquid-crystal polyester processed product, the adhesion to a metal layer having conductivity can be further increased.

The liquid-crystal polyester resin formed bodies of Examples 1 and 2 have a surface wetting tension of 44 mN/m before surface treatment, which is higher than the surface wetting tension of Comparative Example 1 before surface treatment, 37 mN/m. Although the reason for this is not clear, it is presumed that the alkyl group represented by $R_1$ in general formula (1) is oxidized by heating during forming of the liquid-crystal polyester resin and converted into a polar group such as a carboxyl group, thereby improving the surface wetting tension.

The invention claimed is:

1. A method for producing a liquid-crystal polyester processed product, comprising a step (I) of performing an oxidation treatment on a surface of a liquid-crystal polyester resin formed body including a repeating unit represented by general formula (1):

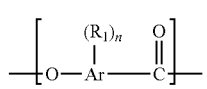
(1)

wherein Ar represents a phenylene group, a naphthylene group, or a biphenylene group, $R_1$ represents a linear alkyl group having 1 to 6 carbon atoms, a branched alkyl group having 3 to 6 carbon atoms, or a cyclic alkyl group having 5 to 6 carbon atoms, and n represents an integer of 1 to 4, and a step (II) of stacking a metal layer on the surface on which the oxidation treatment has been performed to produce a laminate.

2. The method for producing a liquid-crystal polyester processed product according to claim 1, wherein the oxidation treatment in the step is a plasma treatment, a corona treatment, an ultraviolet (UV) irradiation treatment, a flame treatment, an electron beam treatment, a chemical treatment with an oxidizing agent, or a heat treatment in the presence of oxygen.

3. A method for producing a liquid-crystal polyester processed product, comprising a step (I) of performing an oxidation treatment on a surface of a liquid-crystal polyester resin formed body including a repeating unit represented by general formula (1):

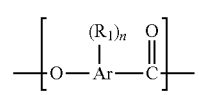
(1)

wherein Ar represents a phenylene group, a naphthylene group, or a biphenylene group, $R_1$ represents a linear alkyl group having 1 to 6 carbon atoms, a branched alkyl group having 3 to 6 carbon atoms, or a cyclic alkyl group having 5 to 6 carbon atoms, and n represents an integer of 1 to 4, and a step (III) of coloring the surface on which the oxidation treatment has been performed to produce colored liquid-crystal polyester fibers.

4. The method for producing a liquid-crystal polyester processed product according to claim 1, further comprising a step (III) of coloring the surface on which the oxidation treatment has been performed to produce colored liquid-crystal polyester fibers.

5. The method for producing a liquid-crystal polyester processed product according to claim 3, wherein the oxidation treatment in the step is a plasma treatment, a corona treatment, an ultraviolet (UV) irradiation treatment, a flame treatment, an electron beam treatment, a chemical treatment with an oxidizing agent, or a heat treatment in the presence of oxygen.

6. The method for producing a liquid-crystal polyester processed product according to claim 1, wherein, in general formula (1), $R_1$ represents a methyl group or a linear or branched alkyl group having 4 carbon atoms.

7. The method for producing a liquid-crystal polyester processed product according to claim 3, wherein, in general formula (1), $R_1$ represents a methyl group or a linear or branched alkyl group having 4 carbon atoms.

* * * * *